United States Patent [19]

Lundahl et al.

[11] 4,163,524
[45] Aug. 7, 1979

[54] VARIABLE STACK FEEDER AND METHOD

[75] Inventors: Ezra C. Lundahl, Providence, Utah; J. Gordon Wiser, Kirkland, Wash.

[73] Assignee: Ezra C. Lundahl, Inc., Logan, Utah

[21] Appl. No.: 917,997

[22] Filed: Jun. 22, 1978

[51] Int. Cl.² ............... B02C 18/06; B02C 21/02
[52] U.S. Cl. ............................ 241/30; 83/869; 83/877; 83/23; 83/42; 83/150; 83/155; 83/488; 83/928; 241/101 A; 241/101.7; 241/283
[58] Field of Search ............... 241/30, 101 A, 101.7, 241/283; 83/869, 877, 23, 42, 150, 155, 488, 928

[56] References Cited

U.S. PATENT DOCUMENTS

| 3,747,457 | 7/1973 | Thompson | 83/488 X |
| 3,773,269 | 11/1973 | Brooks et al. | 241/101 A X |
| 3,830,438 | 8/1974 | Garrison et al. | 241/283 |
| 4,078,460 | 3/1978 | Bowman | 83/877 |

*Primary Examiner*—Frank T. Yost
*Attorney, Agent, or Firm*—Lynn G. Foster

[57] ABSTRACT

Apparatus and method for cutting and feeding foliage material from a stack, the apparatus comprising a wheeled vehicle, for example a wagon pulled by a tractor, capable of being displaced along the ground, a tiltable bed thereon disposed in a parallel position between ground engaging wheels and a powered conveyor so that a stack of foliage may be loaded onto the bed from a position on the ground (or unloaded from the bed back to the ground) and also may be successively advanced along the conveyor bed to provide an overhang beneath and forward of a rotating angularly disposed variable cutter which travels horizontally and then vertically downward in a zig-zag pattern to successively cut slices of foliage from the overhang of the stack. The sliced material is forced out by a shield of the cutter and falls under force of gravity substantially continuously as it is cut onto a transverse foliage conveyor at the front of the vehicle and is thereby deposited upon the ground as a livestock feed windrow while the vehicle is displaced or into feed bins or onto another vehicle for subsequent processing while said stack vehicle is stationary. The rotating cutter is part of a traveling unit mounted on a carriage which is selectively moved vertically on a frame mounted on the vehicle. The traveling unit selectively moves horizontally from side-to-side. A pressurized hydraulic system and electronic system, which may comprise part of the tractor or otherwise, selectively powers the moving parts of the apparatus.

11 Claims, 14 Drawing Figures

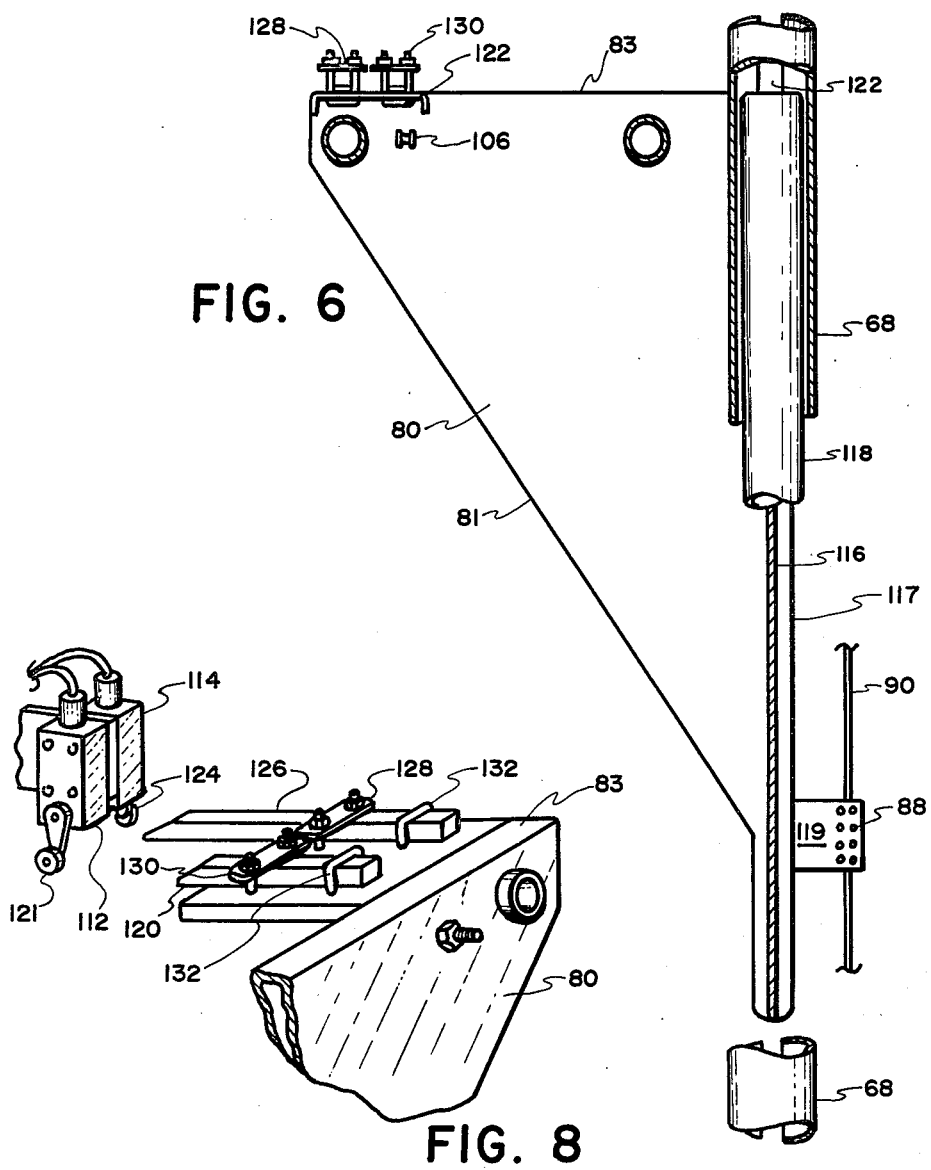
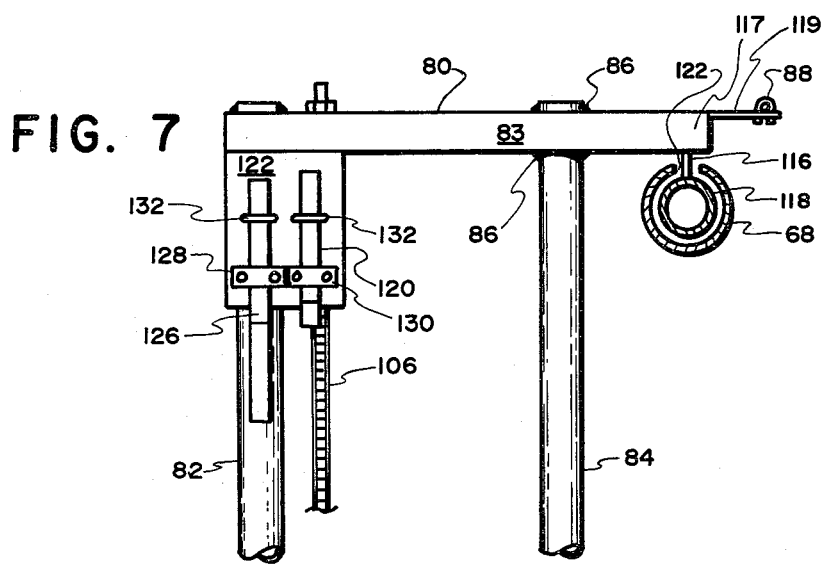

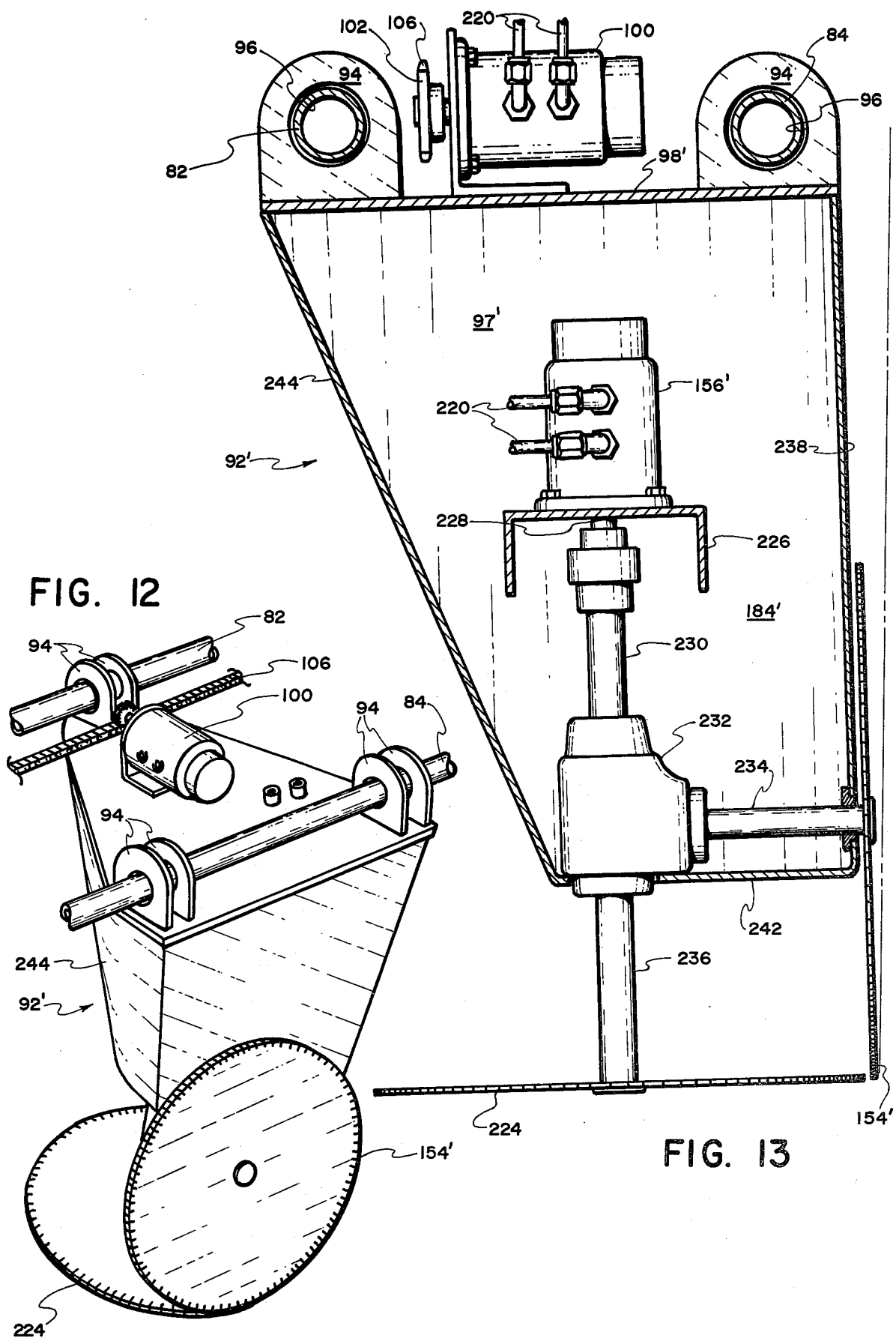

VARIABLE STACK FEEDER AND METHOD

BACKGROUND

1. Field of Invention

The present invention relates broadly to automated distribution of stacked foliage. More particularly, the present invention relates to a variable stack feeder and method for cutting a selected amount of foliage from a stack disposed upon a vehicle at a selected rate and subsequently conveying the cut foliage from the vehicle, such as into a windrow upon the ground for range feeding of livestock or to other equipment for processing.

2. Prior Art

Heretofore, powered foliage stack cutters have been carried by a transporting wagon equipped with stack loading and advancing conveyors, along with a lateral conveyor to transport cut foliage from the wagon onto the ground or elsewhere for feeding or processing. See U.S. Pat. Nos. 3,741,051; 3,773,269 and 3,830,438. These prior art stack cutters have been constrained to a single fixed cutting pattern and a fixed rate at which cutting occurs. None suggest or imply a need or capability for adjustment in the speed of the cutter, the depth of cut, the pattern of the cut or the rate of displacement of the cutter. All of said stack feeders are mounted in such a fashion that the cutters are cantilevered supported. This frequently results in clogging and binding between the cutter and hay cut by the cutter as well as interference between the stack per se and the cutter during the return stroke of the cutter, if any. The cutters and the mechanisms by which each is driven are generally complex or of somewhat obsolete, limited capacity (note the complex driving mechanisms and complicated motion required by U.S. Pat. No. 3,773,269 and the reciprocating sickle blade cutters of the other two cited patents).

All of said prior art approaches have utilized to a substantial extent an angular cut top to bottom and do not teach the capacity or the desirability of making a substantially vertically directed cut nor the advantages of a selectively controlled zig-zag cutting pattern. None of the patents disclose the concept of selectively varying the cut so as to meter the amount of feed displaced by the transverse conveyor depending upon such factors as density and food value.

Each of said patented prior art proposals requires a cutter of substantial width and length, two requiring a cutter equal to or greater than the width of the stack and the other requiring a blade with at least equal to one-half the width of the stack. In addition, each of said proposed devices requires either a separate vibrator or flipper or a rotating deflector to cause the hay being sliced to separate from the stack and the cutter and fall upon the lateral conveyor. Because of the precise complex pattern of displacement of the blade of U.S. Pat. No. 3,773,269, it is incapable of being displaced upward other than when contiguous with the right side of the stack and, therefore, cannot be caused to directly retract into an elevated position with the cutter severing any interfering hay during said retraction. Further, neither of the cutting mechanisms of U.S. Pat. Nos. 3,741,051 and 3,830,438 have any capacity whatever to cut interfering foliage from the stack or otherwise while being retracted to the elevated position.

BRIEF SUMMARY AND OBJECTS OF THE INVENTION

The present invention substantially alleviates or overcomes the above-mentioned limitations of the prior art by providing novel methods and apparatus, which apparatus is relatively simple and inexpensive to manufacture and maintain, and further provides a large degree of flexibility in the use thereof. The present preferred embodiment of the invention comprises a stack feeder wagon or vehicle provided with a bed and a conveyor to load the stack onto the bed and to incrementally advance the stack forwardly. A transverse conveyor discharges foliage cut from the stack from the wagon. A variable rotating stack cutter is employed which travels horizontally and vertically in a zig-zag pattern. The depth of cut during each horizontal pass, the rate of horizontal displacement and the rate of travel may be selectively controlled to meter from the machine a controlled amount of foliage per unit of time, taking into account variations in density and moisture content, for example stacks of varying configuration and size may be handled with economy of movement of the cutter and the cut foliage is removed from the stack and transported from the wagon without binding, clogging or bunching.

Accordingly, it is a primary object of the present invention to provide simplified and novel apparatus for and methods of controlled cutting and feeding foliage from a stack upon a vehicle.

Another object of the invention is to provide novel apparatus for feeding material from a stack upon a vehicle requiring minimum personnel and minimum attention of the operator thereof.

Another object of the present invention is to provide novel apparatus for feeding foliage from a stack carried upon a vehicle, which apparatus is controlled to accommodate stacks of varying sizes and shapes.

Another object of the invention is to provide a novel apparatus and a unique method for feeding foliage from a vehicle supported stack.

Another object of the invention is to provide novel apparatus for and method for feeding foliage from a stack upon a vehicle wherein the stack is sliced in a controlled zig-zag pattern.

A further important object of the invention is to provide novel variable stack feeder apparatus and method for selectively displacing a stack forward in controlled increments to overhang a lateral conveyor while the traveling unit comprising cutter is in an elevated vertical position, the amount of overhang thereby defining the thickness of the cut to be made from the stack while controlling the rate of horizontal displacement and magnitude of vertical decrements of the traveling unit.

An additional object of the invention is to provide a stack feeder comprising a novel cutter assembly comprising two cutter blades disposed generally perpendicularly to one another and which blades cut a generally rectangular swath from the face of a stack during each horizontal leg of travel.

A further object is the provision of a novel simplified and economical stack feeder having one or more of the following features: a variable though elemental cutting pattern and/or cutting and discharge rate to accommodate, for example, variations in density, moisture content and stack dimensions; a generally vertically directed cut to enhance separation of cut foliage from the remainder of the stack and elimination of interference with the stack without the need of other moving parts such as vibrators for separation; a relatively small cutter requiring a series of passes to cut an entire slice from the stack; a mechanism which cuts any interfering hay during the return of the cutter to its beginning position; a cutter which is not interposed between foliage being cut and a lateral discharge conveyor; a simplified rotating cutter which eliminates reliance upon sickle cutters.

A further object is the provision of a novel cutter blade for a stack feeder for long term life and efficiency.

These and other objects and features of the present invention will be apparent from the detailed description taken with reference to the accompanying drawings.

BRIEF DESCRIPTION OF THE DRAWINGS

FIG. 6 is a fragmentary cross-sectional representation showing the manner in which brackets are guided in one of two hollow posts comprising parts of the cutter housing mounting frame;

FIG. 7 is a fragmentary sectional plan view of the machine cutting means showing the stops controlling the extent of the reversal of the horizontal movement and the decremental vertical adjustment of the traveling cutter unit;

FIG. 8 is a partial perspective view of the cutting means showing the control switches and the stops controlling the horizontal vertical paths traversed by the traveling cutter unit;

FIG. 12 is a fragmentary representation of a second preferred traveling cutter unit embodiment employing two perpendicularly disposed cutter blades;

FIG. 13 is a cross-sectional view of traveling cutter unit of FIG. 12; and

DETAILED DESCRIPTION OF THE ILLUSTRATED EMBODIMENTS

Figure 1:
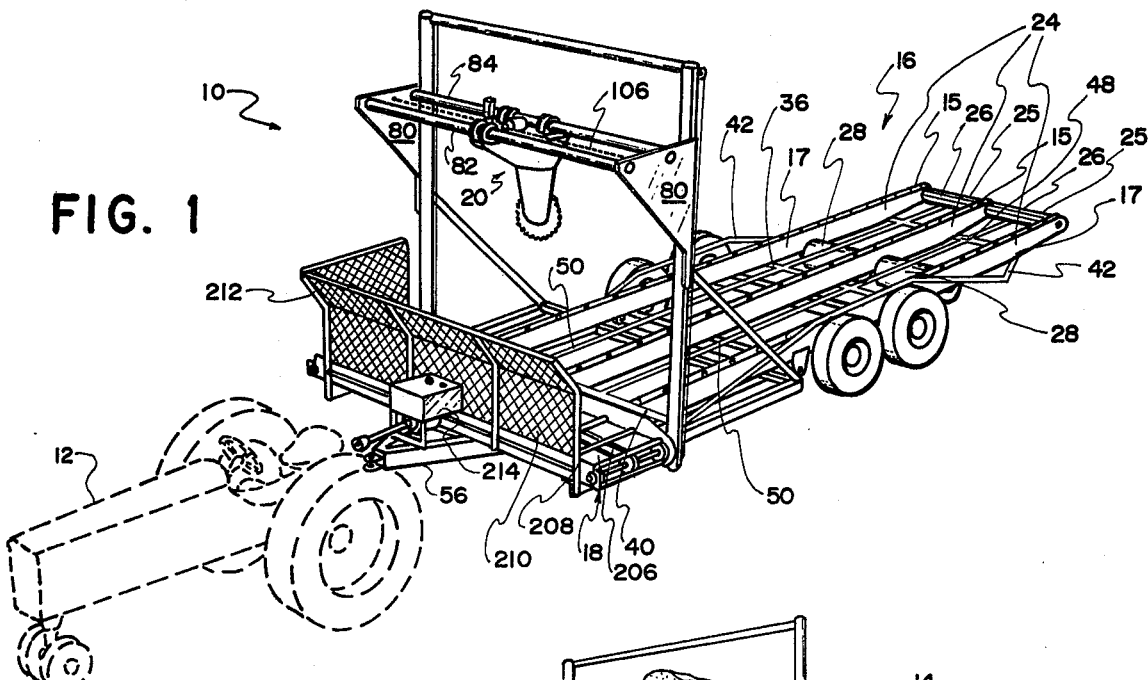
FIG. 1 is a perspective representation of a variable stack feeder according to the present invention, shown attached to a farm tractor illustrated in phantom.

Reference is now made specifically to the drawings which illustrate presently preferred variable stack feeder embodiments of the present invention. FIG. 1 shows feeder machine, generally designated 10, attached to a tractor 12, said tractor 12 being a power source for both moving the feeder 10 along the ground and for operating the various parts of said feeder 10.

Figure 2:
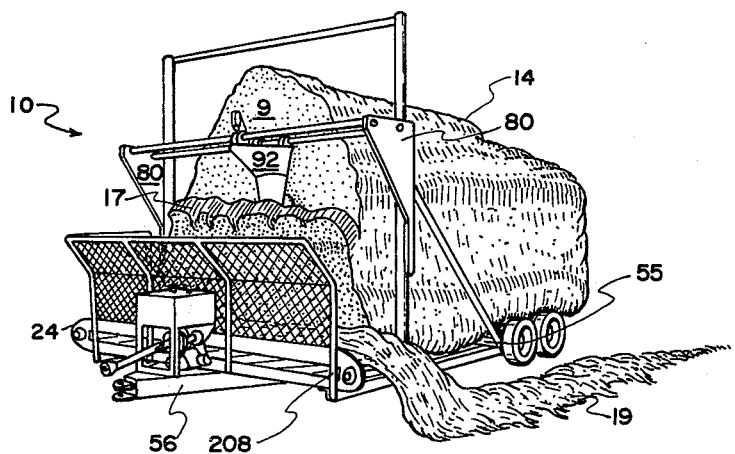
FIG. 2 is another perspective representation of the stack feeder machine indicating the traveling cutter unit in an intermediate position cutting a slice of foliage from a stack and dispersing said slice upon the ground as a windrow.
Figure 3:
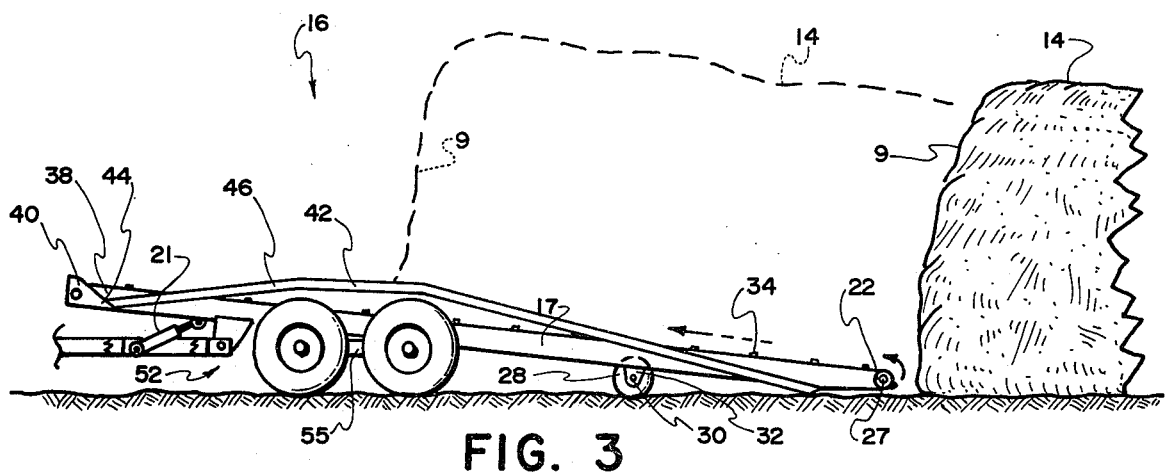
FIG. 3 is a schematic side elevational view illustrating the manner in which a stack of foliage is loaded from the ground onto the tiltable bed of the stack feeder of FIG. 1.

Feeder 10 comprises a stack conveyor loading platform, generally designated 16, a traveling cutter unit, generally designated 20, for slicing a loaded stack 14, and a lateral conveyor, generally designated 18, for dispersing the sliced foliage from the feeder. FIG. 2 shows the feeder 10 in the process of so cutting the foliage material from a previously loaded foliage stack 14 and discharging the cut foliage as a windrow upon the ground for range feeding of livestock. FIG. 3 shows generally the conventional manner by which the stack 14 is loaded onto said feeder 10 from its initial position upon the ground by a stack conveyor 16. The stack 14 is advanced from time-to-time by conveyor 16 to a selected position beneath the rotating and horizontally and vertically movable traveling cutter unit 20. Additional slices are successively cut and dispersed from the feeder 10, each time the conveyor 16 incrementally advances stack 14 into position beneath the traveling cutter unit 20.

Stack conveyor 16, as is conventional, comprises three endless chains 15, each chain 15 rotatably interposed between parallel elongated containing beams 17. Each chain 15 is carried on a track and is exposed along the top edge of beam 17. The chains 15 and beams 17 form three spaced parallel conveying units 24.

Units 24 turn upon idler rollers 26 which contain evenly spaced longitudinal protuberances 25 around the circumference of said rollers 26 which rollers 26 are carried by a fixed axle 27 which axle 27 is rotatably secured to the trailing ends 22 of the elongated beams 17. Large rollers 28 rotate around an axle 30, said axle 30 being secured through lugs 32 which lugs 32 are suitably attached to and extend from the bottoms of the beams 17 to engage the ground and thereby provide support when the trailer is tilted to load the stack 14. Units 24 are also kept in parallel spaced relation by a plurality of transverse rods 36 suitably attached to the undersides of the beams 17. The leading ends 38 of units 24 are attached to an angled end piece 40. Beneath end piece 40 the chains 15 are driven by sprockets connected to a drive shaft.

Stack conveyor 16 is further strengthened by a U-shaped support member 42, the terminal ends 44 of which are suitably attached to end piece 40 (see FIG. 3). The legs 46 of said support member 42 extend along the outermost exteriors of units 24, which legs 46 meet at cross piece 48 at a position under the trailing end 22 of units 24. Additional intermediate longitudinal supports 50 are attached to end piece 40, extend in parallel spaced relation between units 24 and are attached along the top of the plurality of transverse rods 36 and the base 48.

Said conveyor units 24 and the other described components attached thereto comprise a tiltable platform which rest upon axle housing 55 (FIG. 2) which support the wheels, the tilt of which is controlled by hydraulic cylinder 21 and engaged with the ground at the trailing end thereof. Thus, when the trailing end 22 of stack conveyor 16 is lowered to the ground and disposed beneath the front of the stack 14, the evenly spaced outwardly projecting teeth 34 (upon the endless chains 15) engage the underside of the stack 14 and a hydraulic motor 245 rotating said chain conveyors 15, moves the chain conveyors 15 and the stack 14 onto the bed of the vehicle comprising the stack conveyor 16, in a manner well known to the prior art. Large rollers 28 are contiguous with and engage the ground when trailing end 22 is in the described tilted position, to provide support.

Figure 4:
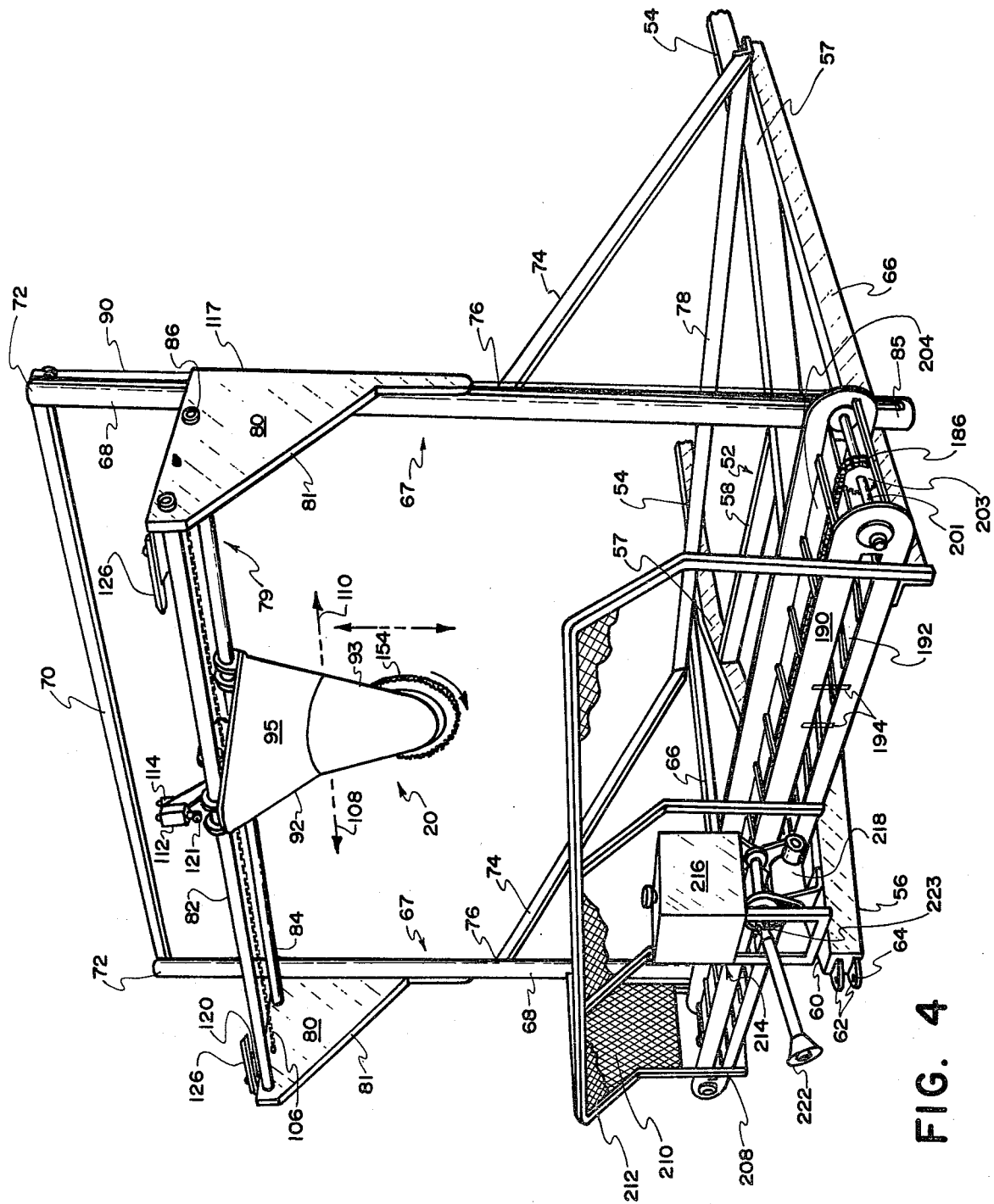
FIG. 4 is a fragmentary perspective of the stack traveling cutter unit of FIG. 1 shown in its elevated position and further showing the lateral conveyor and the hydraulic power system.

The feeder 10 also comprises an underlying stationary frame generally designated 52. Frame 52, as best shown in FIG. 4, comprises two parallel members 54. Members 54 extend forwardly and are angled toward each other beginning at sites 57 forming a V-shaped tongue 56 at the leading end 60 of framework 52. (See FIG. 4) Said tongue 56 comprises a transverse brace 58 attached to members 54 adjacent sites 57. Two lugs 62 present vertically aligned apertures 64 and comprise a hitch at the leading end 60 of the tongue 56. Two linear transverse conveyor support members 66 (angles) are respectively attached to the exterior of members 54 adjacent sites 57 and extend forward in parallel relation to one another.

The stationary frame supports a vertical mast 67. Mast 67 comprises two hollow cylindrical posts 68 which are respectively rigidly attached to support members 66 and extend vertically upward in parallel spaced relation to each other to a height substantially greater than the height of stack 14. A cross brace 70 spans between and rigidly attachs to the top ends 72 of posts 68. The length of brace 70 exceeds the width of the stack 14. A diagonal brace 74 spans between and is connected to the midpoint of each post 68 and the trailing end of the adjacent member 66. Cross member 78 connects to the trailing ends of both diagonal braces 74 and to frame members 54 adjacent sites 57.

The mast 67 supports a vertically displaceable carriage 79. Carriage 79 comprises two brackets 80 at opposite sides of the carriage which are generally planar and of right triangular shape. The ends of parallel circular bars 82 and 84 are integrally connected at sites 86 (FIG. 7) to both brackets 80 in precise parallel spaced relation.

FIG. 7 also illustrates the manner in which the carriage 79 is vertically reciprocably joined to the mast 67. Specifically, a web 116 welded to the interior surface near the trailing edge 117 of each triangular bracket 80. Web 116 extends through a vertical slot 122 in the adjacent post 68. The length of the slot 122 defines the upper and lower limits to which the carriage 79 (and the traveling cutter unit 20) may be vertically displaced. A hollow cylindrical guide 118 is attached to the exposed edge of said web 116 within the post 68. Cylindrical guide 118 is concentrically disposed within and in slidable contact with the interior wall of hollow post 68.

A lug 119 is attached to edge 117 adjacent diagonal edge 81 of each bracket 80. Lug 119 carries clamp 88 which attaches said brackets 80 to a cable 90 which cable 90 is carried by a plurality of pulley wheels to vertically raise and lower the traveling cutting unit 20, as hereinafter more fully described.

The traveling cutter unit 20 comprises a cutter housing, generally designated 92, comprising a generally triangularly shaped top cover plate 98 and one flat and vertical surface 93 having a generally U-shape with a rounded bottom extending downwardly on the side of housing 92 which is facing stack 14. The remainder 95 of housing 92 is a canopy which contiguously engages the exterior edges of cover plate 98 and the vertical edges of surface 93. Canopy 95 is of a generally curving, tapering V-shape, also with a rounded bottom. Said housing 92 has a hollow interior cavity 97 and does not rotate or independently move. Nevertheless housing 92 serves to deflect each cut strip 17 of hay away from the remainder of stack 14 as the traveling unit 20 is horizontally displaced from side-to-side.

Figure 10:
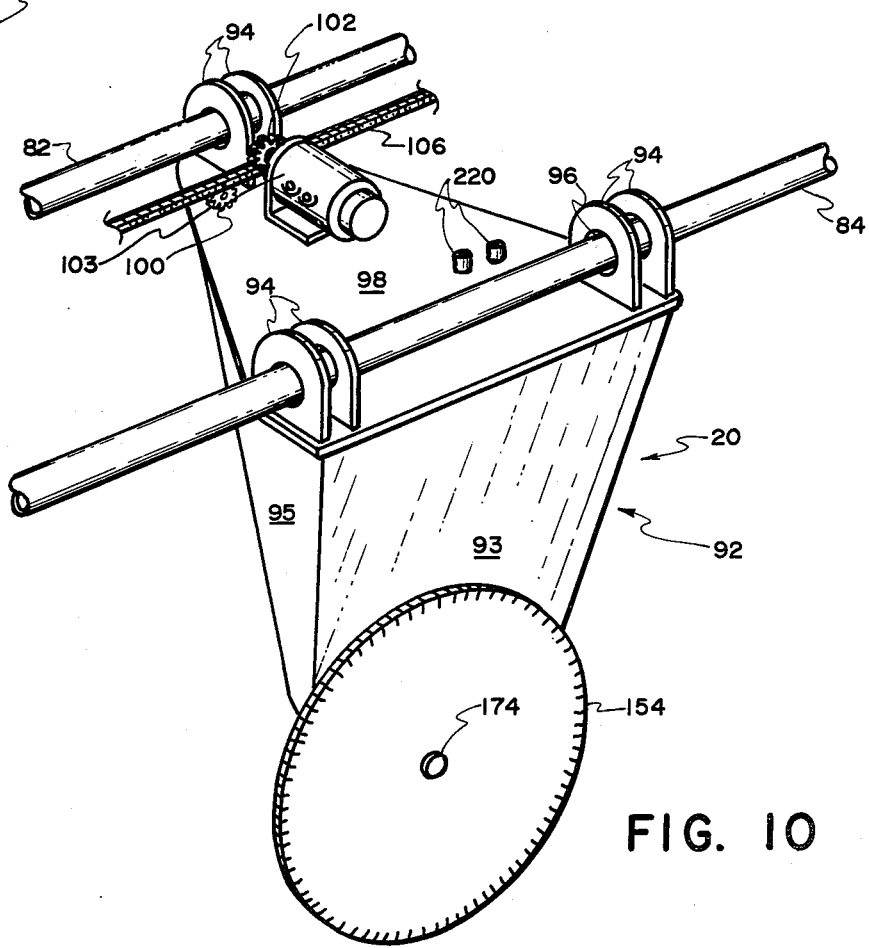
FIG. 10 is a fragmentary perspective representation of the traveling cutter unit including the hydraulic motor and the chain used to move the cutter unit in a horizontal direction.

Cutter housing 92 is suspended from the horizontal bars 82 and 84 of the carriage 79 by six lugs 94 providing three pairs of aligned apertures 96 therethrough. Two parallel lugs 94 being disposed at and connected to each corner of the generally triangular housing cover plate 98 (see FIG. 10). Each aperture 96 contains a bushing with rod 82 slidably passing through and being precisely aligned with the two apertures 96 in the two leading lugs 94. Rod 84 slidably passes through and is precisely aligned with the four apertures 96 in the four trailing lugs 94. Thus, the traveling unit 20 may be caused to horizontally slide along rods 82 and 84 in either direction.

Said housing cover plate 98 also carries on its topmost surface, a horizontal drive hydraulic motor 100 having a sprocket 102 on an output shaft 104. Said sprocket 102 engages a stationary drive chain 106 which tightly spans the entire lateral width between and is connected to brackets 80. Two idler sprockets 103 engage the opposite side of the chain drive 106 adjacent drive sprocket 102 to stabilize the chain. Thus, the cutter unit 20 is caused to travel horizontally at a selected elevation along the bars 82 and 84. The horizontal drive motor 100 is reversible, so that the cutter unit 20 is selectively caused to travel back and forth between brackets 80 as indicated by the directional arrow 108 and 110 in FIG. 4.

Two hydraulic control switches 112 and 114 are disposed above and connect to housing cover plate 98 (see FIG. 4) in a position so as to be activated by adjustable stops carried by brackets 80. With reference to FIGS. 6–7, a horizontal plate 122 is connected to each bracket 80 adjacent the intersection of edges 81 and 83 and extends inwardly in a horizontal plane essentially perpendicular to said bracket 80. Elongated stops 120 and 126 (see FIG. 8) extend horizontally inwardly and are adjustably mounted upon each plate 122 by bolt clamps 128 and 130 and stabilizing U-shaped brackets 132. Thus, the displacement pattern of the traveling unit 20 can be altered by varying the location of the distal ends of one or more of the four stops 120 and 126.

The direction of the horizontal movement of cutter unit 20 is reversed when stop 120 is contacted by actuating arm 121 of control switch 112. (Thus causing motor 100 to reverse.) Each decrement of downward vertical movement of the cutting unit 20 will be initiated when stop 126 is contacted by actuating arm 124 of control switch 114. As can be seen from FIG. 8, this downward movement is commenced before horizontal displacement is reversed. Vertical displacement will continue until the stop 126 breaks contact with the switch arm 124 after the cutter unit 20 has traversed a distance equal to the difference in the distal end setting of the adjacent stops 120 and 126 along return horizontal path along bars 82 and 84. Thus, the decremental change in elevation of cutting means 20 is controlled by the magnitude of the relative positions of distal ends of adjustable stops 120 and 126 at each bracket 80. Thus, the traveling cutter unit 20 traverses a selectively variable zig-zag path. Motor 100 is a conventional variable speed device so that variation of the speed of motor 100 will vary the rate at which the traveling cutter unit 20 is displaced.

Figure 9:
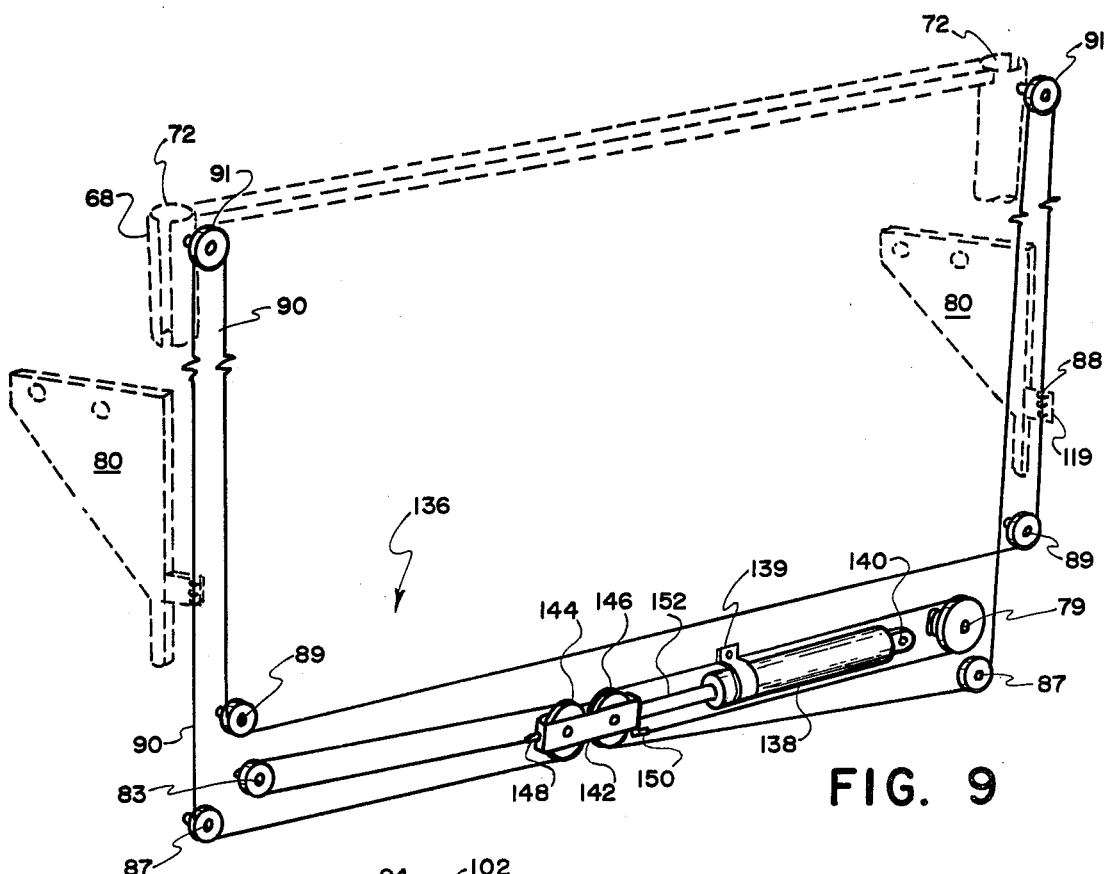
FIG. 9 is a perspective schematic of the hydraulic cylinder, pulley block and cable system which controls the vertical position of the support brackets carrying the traveling cutter unit.

Returning now to the pulley system, generally designated 136 (see FIG. 9), cable 90 is attached to the top of each post 68 by a rotatable pulley 91. Two pulleys, 87 and 89 are rotatably each suitably attached towards the base 85 of each post 68. Two pulleys 83 and 79 are rotatably attached to one exterior stationary surface of the frame of lateral conveyor 18. Cable 90 is powered by a two-way hydraulic cylinder 138 which is bracket secured at 139 and pivotally attached at its trailing end to the aforementioned exterior frame surface of lateral conveyor 18, by pin 140. The piston rod 152 of cylinder 138 connects with cable 90 through pulley block 142 which rotatably carries pulleys 144 and 146. The ends 148 and 150 of cable 90 are rigidly attached respectively to the distal and proximal ends of pulley block 142. The cable and pulley system 136 is essentially a block and tackle arrangement such that a small displacement of the piston rod 152 will create a much larger vertical displacement of the carriage 79 and traveling cutter unit 20, the cable being rigidly connected to the two brackets 80 at plates 120 by clamps 88. Appropriate actuation of cylinder 138 will extend the piston rod 152 and cause the cable 90 to raise the cutting unit 20 from its lowest position to its fully elevated position. During the descending path of the carriage 79 and traveling cutter unit 20 selective retraction of piston rod 152 causes the cutting unit 20 to be lowered through one decrement.

Cutter blade 154 is preferably a circular disc blade heretofore used to cut steel or wood of relatively small diameter. However, other available blades can be used. Blade 154 is disposed adjacent the lower exterior surface 93 of cutter housing 92 (see FIGS. 10 and 11) which surface 93 faces the stack 14. A portion of blade 154 extends below housing 92 so as to easily engage the leading end of stack 14 and is disposed approximately two degrees from a vertical plane 75 (see FIG. 11) so as to avoid binding with the vertical cut surface 15 of the stack 14.

Figure 11:
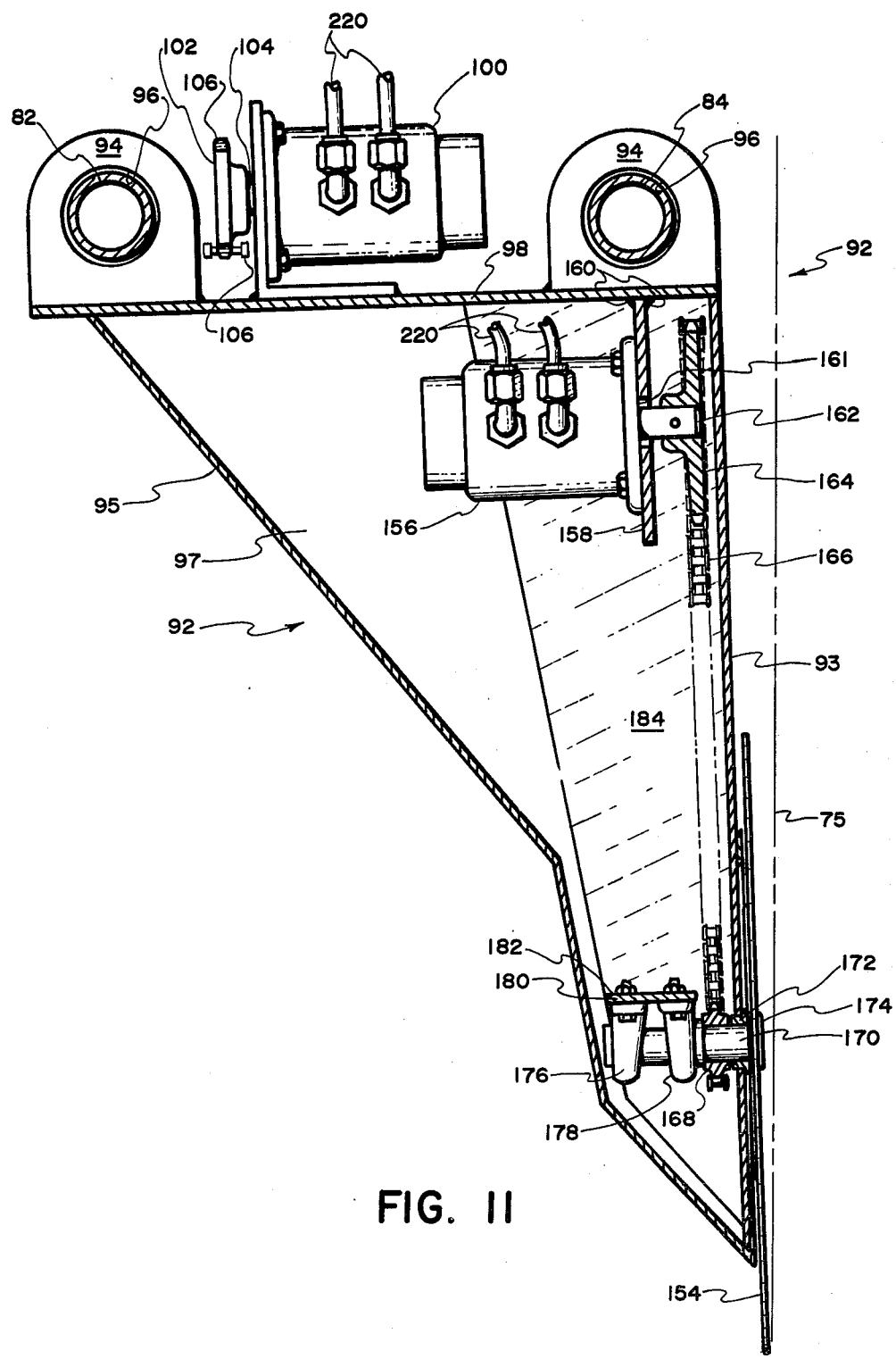
FIG. 11 is a cross-sectional view of the traveling cutter unit of FIG. 10 showing the hydraulic motors which rotate the cutter blade and horizontally displace the cutter unit.

Referring now to FIG. 11, a second hydraulic motor 156 which powers cutter blade 154, is disposed within and connected to top plate 98 by a bracket 158 which bracket is welded at sites 160 to one side of the plate 98. An output shaft 162 of cutter device motor 156 passes through an aperture 161 in bracket 158 and non-rotatably connects to a sprocket 164. Said sprocket 164 engages an endless cutter drive chain 166, which in turn engages another sprocket 168 which is non-rotatably connected to a shaft 170 which extends loosely through a bushing 172 disposed within an aperture in plate 93. An enlarged head 174 secures blade 154 to shaft 170. The opposing end of shaft 170 rotates within bearings 176 and 178. Bearings 176 and 178 are attached by clamps to a bracket 180. Bracket 180 is welded 182 to the interior housing wall 184. Thus, the hydraulic components which horizontally displace and which rotate the blade 154 move with and comprise part of the traveling unit 20.

Figure 5:
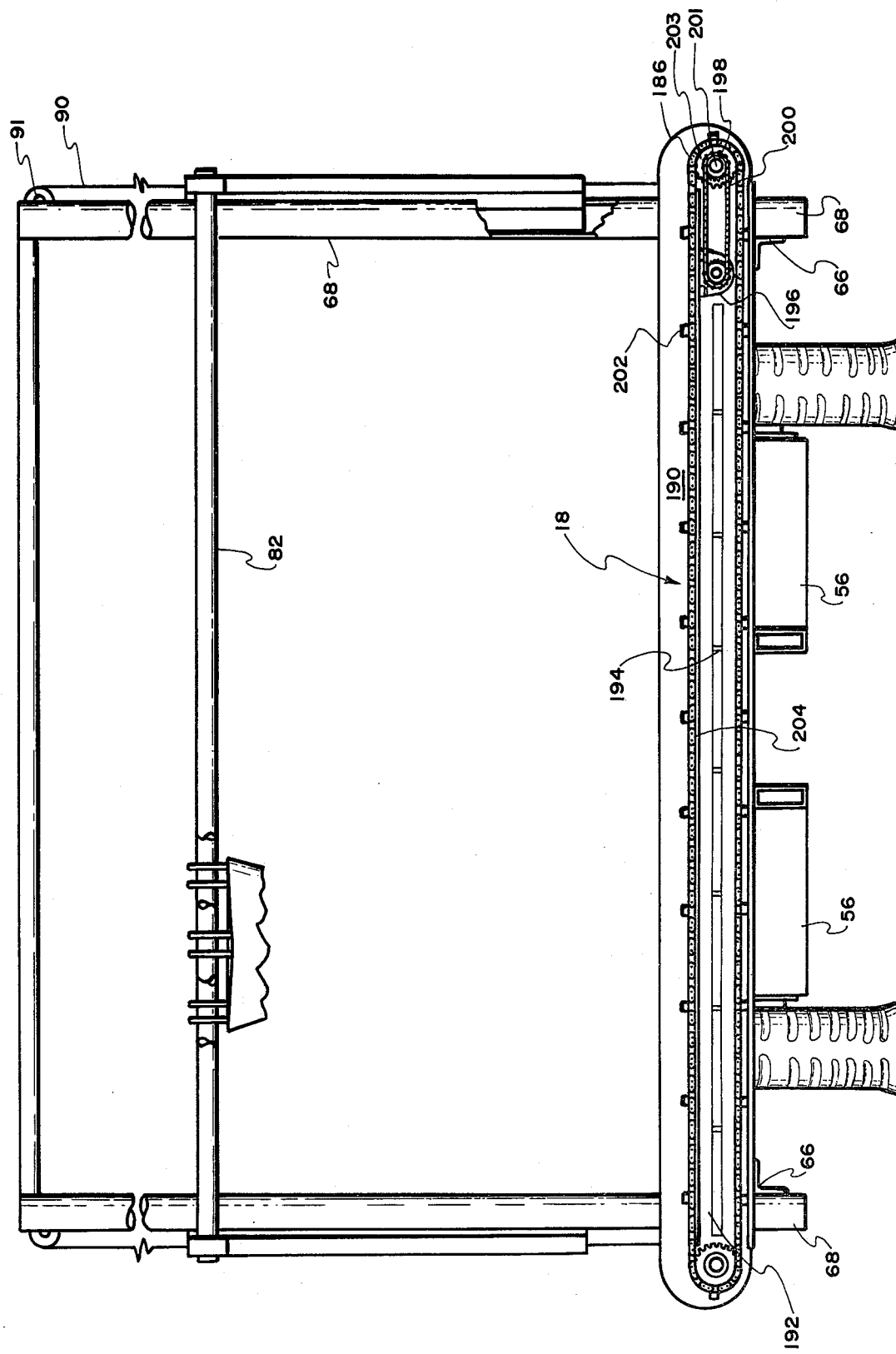
FIG. 5 is a fragmentary cross-sectional view of the stack feeder showing the lateral conveyor.

The lateral conveyor 18 (FIG. 5) is disposed transversely across the V-shaped tongue 56 of the stationary frame 52 and across the support member 66. Conveyor 18 lies alongside angled end piece 40 with the support posts 68 which carry the cutting unit 20 lying between lateral conveyor 18 and stack conveyor 16 contiguous with the frame of lateral conveyor 18. Conveyor 18 comprises an endless chain drive 186 centrally disposed between elongated stationary side walls 190, each side wall having elongated slots 192 therethrough with a plurality of vertical supports 194 attached to the exteriors of the side walls 190 across the slots 192. Conveyor 18 is powered by a third hydraulic motor 196 (FIG. 5) through its output shaft and drive sprocket, chain 200, sprocket 198, drive shaft 201, drive sprocket 203 and chain 186 by means of a chain 200. The exterior of chain 186 carries a plurality of evenly spaced U-shaped slats 202. A flat surface member 204 is disposed between the interior surfaces of sidewalls 190 above the slots 192 and immediately below the top run of chain 186. Surface member 24 comprises an elongated U-shaped central channel 206 which guides the travel of the top run of chain 186.

A mesh screen 210 or other suitable material constrains displacement of cut foliage so that it falls upon conveyor 18. Screen 210 is supported by upright braces 208 with an outwardly angled top flair 212.

The cutter blade 154 engages the stack 14 while moving horizontally at successively lower levels determined by successive decrements in the vertical position of brackets 80, upon which the cutter housing 92 is mounted, as horizontal strips 17 comprising a vertical slice of selectable thickness is cut from the face 9 of stack 14. The cut strips of foliage guided in its course by mesh screen 210, falls successively upon lateral conveyor 18 whereby it is discharged from the feeder 10 upon the ground as a windrow 19 for easy range access by livestock. (see FIG. 2) When a slice 17 has been incrementally severed top to bottom, the cutting unit 20 and carriage 79 are returned to the top of the post 68, the stack 14 is advanced a selected distance by the stack conveyor 16, and the slicing operation repeated.

A power unit, generally designated 214 (see FIG. 4) is disposed upon the tongue 56 of stationary frame 52 in front of the feeder machine apparatus. The unit 214 comprises a hydraulic fluid tank 216 and a master hydraulic pressurizing unit 218 which communicates hydraulic fluid under pressure through hydraulic lines 220 (see FIG. 11), to horizontal drive motor 100 and cutter blade drive motor 156. The horizontal drive motor 100 is driven by fluid exhausted from the cutter blade drive motor 156, so that any stoppage of the cutter blade 154 will also stop the cutter motor 156, which in turn will starve the horizontal drive motor 100 for hydraulic fluid. Thus, horizontal drive motor 100 will stop.

Unit 214 is powered from a power take-off connection on the tractor 302, passing through the power connecting shaft 222 and a universal joint 223.

The hydraulic motor 196 powers the lateral conveyor 18. The two-way hydraulic cylinder 138 powers the vertical movement of the cutting unit 20. The hydraulic cylinder 21 controls the tilt of the stack conveyor 16. A further hydraulic motor 245 (FIG. 14) powers the stack conveyor 16. All of the foregoing power units are supplied with hydraulic fluid from tractor hydraulic pump 308 (FIG. 14).

A second preferred embodiment of the stack feeder machine 10 employs an additional cutter blade 224, as illustrated in FIGS. 12 and 13. The cutter housing generally designated 92' has a different configuration. The flat generally vertical surface 238 is configurated as a trapezoid and is disposed facing stack 14. A horizontal housing plate 242 is disposed at the bottom of said cutter housing 92' and a curving tapering surface 244 contiguously engages all of the exterior edges of the cutter plate 98', flat surface 238 and bottom plate 242, thereby forming the cutter housing 92' with a hollow interior cavity 97'. As illustrated in FIG. 13, the cutter drive motor 156' is disposed upon a bracket 226 welded to an interior wall 184' of the housing 92' so that the output shaft 228 of motor 156 is downwardly disposed and coupled to a shaft 230. Shaft 230 drives a conventional gear box 232, which comprises a first horizontal output shaft 234 upon which the cutter blade 154' is mounted, and to a second vertically disposed output shaft 236 communicating rotational energy to the cutter blade 224. The additional cutter blade 224 is disposed generally perpendicular to the cutter blade 154' so that a generally rectangular strip of material is cleanly cut from the stack 14 each time the traveling unit 92 travels horizontally from one side to the other side. This arrangement of the cutter blades 154 and 224 substantially alleviates any possibility of bunching of any foliage as it is cut from the stack 14, and may be advantageous when the stack is composed of foliage material having long stems or the like.

Figure 14:
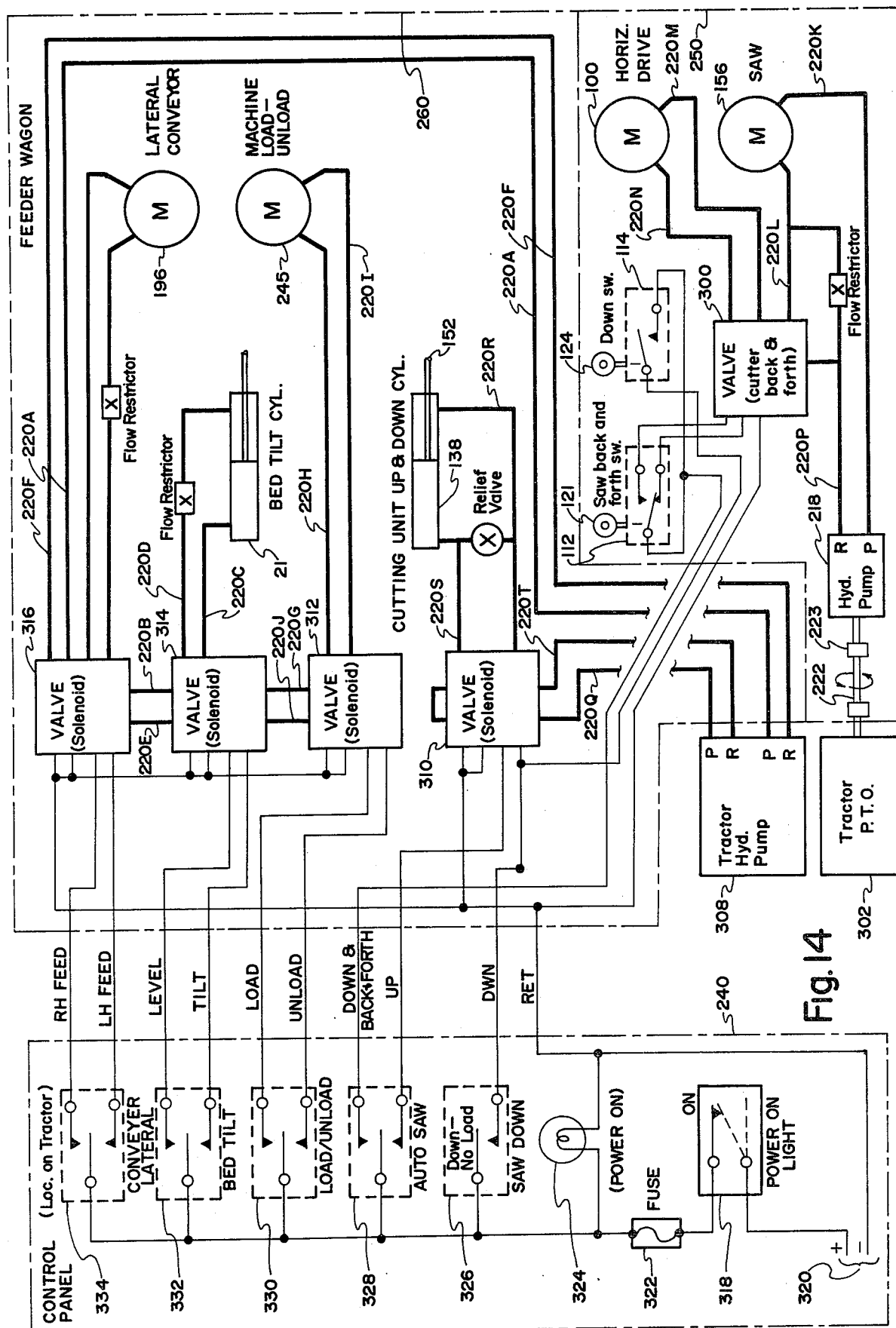
FIG. 14 is a schematic representation illustrating the electrical and hydraulic control system for the stack feeder of FIG. 1.

Reference is now made to the electronic-hydraulic schematic of FIG. 14 for the purpose of describing the hydraulic and electronic functions during the following events: (a) stack loading, (b) strip slicing, (c) stack advancement and (d) lowering the cutter in an idle state under no load conditions. It should be appreciated that the lateral conveyor may be driven in either direction during strip slicing by motor 196 under the control of switch 334 and solenoid valve 316.

More specifically, broadly FIG. 14 schematically depicts a control panel 240, which is disposed at the tractor 12, the cutting controls 250 and the controls 260 comprising solenoid valves and hydraulic power units concerning functions of the bed of the feeder 10.

A source of electrical power 320 is provided, which may be the 12 volt battery source of the tractor 12. Power is delivered to the control panel 240 by placing the master switch 318 in its "on" position. This delivers electrical energy across master fuse 322 to the input of each of the electric switches 326, 328, 330, 332 and 334. Power is also delivered to a light indicator 324 to visually indicate on the face of the panel the existence of electric power to the operator.

Under the foregoing conditions, the tractor and feeder 10 (in an empty state) are back toward the stack 14. With the tractor hydraulic pump 308 operating, switch 332 is placed in its downward "on" position, thereby actuating solenoid valve 314 and causing hydraulic fluid emanating from pump 308 to be displaced through pressure line 220A, solenoid valve 316, line 220B, solenoid 314 and line 220C to the backside of cylinder 21 thereby fully extending the piston thereof (see FIG. 3), with hydraulic fluid being exhausted from the forward end of cylinder 21 through line 220D, solenoid 314, line 220E, solenoid 316 and line 220F to the hydraulic pump 308. Thus, the empty bed of the feeder 10 is tilted with the trailing end thereof disposed at the base of the leading end 9 of the stack 14.

The tractor 12 and feeder 10 are thence displaced rearwardly to force the trailing end of the tilting bed underneath the leading edge 9 of the stack 14. Simultaneously with or successive to said rearward displacement, the load/unload switch 330 is displaced to its upper "on" position actuating the solenoid valve 312 causing hydraulic fluid ingressing to solenoid valve 314 through line 220B to be displaced through line 220G, solenoid valve 312, line 220H into motor 245 causing the motor 245 to rotate the chain conveyors 15 toward the tractor along the top of the beams 17 with the conveyor protrusions 34 gripping the underside of the stack 14 and advancing it onto the tilted bed. The flow of hydraulic fluid along line 220H is continuous to motor 245 during this phase of operation with hydraulic fluid exhausting from motor 245 to the tractor hydraulic pump 308 through line 220I, solenoid valve 312, line 220J, solenoid 314, line 220E, solenoid valve 316 and line 220F.

Once the stack 14 has been advanced onto the bed such that a selected short distance of the front 9 of the stack 14 projects forward (into a vertical column of space directly above the lateral conveyor 18) and is equally forward of the cutting blade 154, switch 330 is returned to its "off" condition, which deactivates solenoid valve 312 and stops the motor 245. The switch 332 is then placed in its upper "on" position, which causes solenoid valve 314 to be actuated to deliver hydraulic fluid under pressure through line 220D and exhaust hydraulic fluid along line 220C to thereby retract the cylinder 21 to level the bed with the stack 14 resting thereon. At this point in time, switch 332 is placed in its "off" position, deactivating solenoid valve 314 and retaining the cylinder 21 in its retracted position. Solenoid valves 310 and 316, tractor power take-off 302, hydraulic pump 218, lateral conveyor motor 196, cutting unit up and down cylinder 138, and motors 100 and 156 are also "off". (At this juncture, the carriage 79 and the traveling cutting unit 20 are in their elevated or desired positions above the leading edge 9 of the stack 14.)

Normally, with the stack loaded as indicated upon the feeder 10, the tractor 12 is caused to pull the feeder to a location where it is desired to discharge the foliage, for example along the ground as a windrow (with the tractor 12 being advanced slowly during the cutting operation), into feed bins or into other equipment for further processing. For the sake of simplicity, let it be assumed that range feeding of livestock is desired and that a windrow is to be placed upon the ground. (See FIG. 2)

With the feeder 10 located as desired in the field, the tractor hydraulic pump 308, the tractor power take-off 302, the hydraulic pump 218, the lateral conveyor switch 334, the solenoid valve 316, the lateral conveyor motor 196, the cutter back and forth valve 300 and the motors 100 and 156 are activated and left activated through the entirety of the strip slicing operation. Switch 332, motor 245, cylinder 21 and switch 326 are retained in their "off" conditions during strip slicing.

The power take-off 302 of the tractor drives hydraulic pump 218 causing hydraulic fluid to be displaced through line 220K to continuously rotate motor 156 which in turn rotates cutting blade 154. Exhaust hydraulic fluid from motor 156 is displaced along line 220L, through valve 300, and alternately, for equal intervals of time, along lines 220M and 220N, respectively, to oppositely drive motor 100 first in one horizontal direction and then in the other, as described above. Thus, lines 220N and 220M alternately operate to exhaust hydraulic fluid from motor 100 through valve 300 and along line 220P to the hydraulic pump 218.

With switch 328 is its upper "on" position, electrical power is delivered to both traveling switches 112 and 114. Thus, engagement of actuator 124 of switch 114 with the distal end of either of the two opposed stops 126 will close switch 114 thereby actuating solenoid 310. In response, solenoid 310 accommodates displacement of hydraulic fluid from tractor hydraulic pump 308 along line 220Q through line 220R to the front of cylinder 138 to start retraction of the piston rod 152. This retraction continues as long as actuator arm 124 is in contact with stop 126.

A short time later, actuator 121 of switch 112 engages the distal end of stop 120. This reverses the "on" condition of switch 112 which causes valve 300 to reverse hydraulic flow to motor 100 which reverses the rotation of motor 100 and causes the traveling unit 20 to reverse its horizontal displacement.

As soon as the reverse horizontal displacement has traversed a distance equal to the difference between the horizontal projections of the adjacent distal ends of stops 120 and 126, actuator 124 clears stop 126 causing switch 114 to be returned to its "off" condition. This deactivates solenoid valve 310 and stops further retraction of the piston rod 152. By adjusting the differential between locations of the distal ends of stops 120 and 126, the magnitude of the decremental vertical displacement (caused by cylinder 138 and the cable and pulley drive of FIG. 9) can be varied as desired. This variation will correspondingly vary the depth of cut by blade 154 for each strip being sliced from face 9 of stack 14.

The described horizontal displacement, vertical decremental displacement and reverse horizontal displacement continues such that a strip is sliced during each horizontal stroke until a full vertical slice of hay has been removed from the face 9 of stack 14 and the carriage 79 has engaged the bottom of the two slots 122 in posts 68 and the blade 154 is disposed immediately above the lateral conveyor 18.

At this point, switch 328 is placed in its down "on" condition, terminating back and forth motion by deactivating switch 112 and activating solenoid valve 310 causing hydraulic fluid to be delivered to the trailing end of the cylinder 138 along line 220S. Hydraulic fluid is exhausted through line 220R, solenoid 310 and line 220T to the tractor hydraulic pump 308. Extension of piston rod 152 causes the pulley and cable system of FIG. 9 to fully elevate the traveling cutting unit 20 to its upright position, following which the stack is advanced a desired distance in the manner previously described and the strip slicing operation repeated. The blade 154 continues to rotate during the elevating of the traveling unit 20 so that any interfering foliage will be readily severed and caused to fall upon the lateral conveyor 18 thereby avoiding binding.

It is to be appreciated that on occasions, the traveling cutting unit 20 and carriage 79 may be in an elevated or partially elevated position and it is desired to lower the same with or without cutting. This is done by actuating saw down electric switch 326 which activates solenoid valve 310 causing hydraulic fluid in line 220R to pass into the forward end of the cylinder 138 to retract the piston rod 152 with hydraulic fluid being exhausted along line 220S.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of strip slicing foliage from the end of a stack thereof comprising the steps of:
   placing the stack of foliage upon a vehicle and causing one end thereof to be disposed generally above a lateral cut foliage conveyor and generally below a cutting mechanism comprising rotatable blade means;
   rotating the blade while displacing the blade in vertical and horizontal directions in a zig-zag pattern to successively horizontally slice strips of foliage from the face of the stack, which strips fall under force of gravity upon the lateral conveyor.

2. A method according to claim 1 further comprising the step of prying with structure adjacent the rotating blade each cut strip away from the stack whereby the sliced hay is caused to substantially continuously and uniformly be supplied to the lateral conveyor.

3. A method according to claim 1 further comprising the step of selectively controlling the magnitude of one or more segments of said zig-zag displacement to accommodate variations in stack dimensions, stack density, moisture content of the foliage and the like.

4. A method according to claim 1 further comprising the step of maintaining at all times a constant blade orientation.

5. A method according to claim 1 further comprising the step of terminating the zig-zag pattern and returning the blade to an elevation above the stack while continuing to rotate the blade means whereby interfering foliage, if any, will be instantaneously severed by the blade means and binding thereby avoided.

6. A stack feeder comprising:
   a stack-receiving vehicle;
   lateral conveyor means;
   means for selectively advancing the stack upon the vehicle into a position generally above the lateral conveyor means;
   a cutting mechanism comprising rotatable blade means;
   means supporting the cutting means;
   means for selectively rotating the blade;
   selectively operable means for successively displacing the cutting mechanism vertically and horizontally into a zig-zag pattern to horizontally slice a series of strips of foliage from the end of the stack, which strips fall upon the lateral conveyor means.

7. A stack feeder according to claim 6 wherein said supporting means are disposed substantially above the strips cut by the rotating blade means.

8. A stack feeder according to claim 6 wherein said rotatable blade means comprises a blade of relatively small diameter disposed at an angle away from the stack on the order of two degrees from the vertical.

9. A stack feeder according to claim 6 wherein the supporting means comprise a vertically displaceable carriage carried upon a mast and said cutting mechanism comprises horizontally displaceable means carried by the carriage.

10. A stack feeder according to claim 6 wherein said rotatable blade means comprises two substantially perpendicular juxtaposed blade means to both horizontally and vertically sever each strip cut from the stack.

11. A stack feeder according to claim 6 further comprising the control means for selectively varying the rate of motion of one or more of said moving parts to meter foliage discharged by the lateral conveyor means to correlate with variations in foliage density, moisture content, stack dimensions and the like.

* * * * *